United States Patent
Dumschat

(10) Patent No.: US 12,055,514 B2
(45) Date of Patent: Aug. 6, 2024

(54) LEAD-FREE GALVANIC OXYGEN SENSOR

(71) Applicant: Life Safety Distribution AG, Hegnau (CH)

(72) Inventor: Christa Dumschat, Wismar (DE)

(73) Assignee: Life Safety Distribution AG, Hegnau (CH)

( * ) Notice: Subject to any disclaimer, the term of this patent is extended or adjusted under 35 U.S.C. 154(b) by 428 days.

(21) Appl. No.: 16/847,225

(22) Filed: Apr. 13, 2020

(65) Prior Publication Data

US 2020/0240948 A1    Jul. 30, 2020

Related U.S. Application Data

(63) Continuation of application No. 14/174,459, filed on Feb. 6, 2014, now abandoned.

(51) Int. Cl.
*G01N 27/26* (2006.01)
*G01N 27/404* (2006.01)
*G01N 27/30* (2006.01)

(52) U.S. Cl.
CPC ........... *G01N 27/404* (2013.01); *G01N 27/30* (2013.01)

(58) Field of Classification Search
CPC ..... G01N 27/404; G01N 27/26; G01N 27/413
See application file for complete search history.

(56) References Cited

U.S. PATENT DOCUMENTS

| | | | |
|---|---|---|---|
| 3,515,658 A | 6/1970 | Amdur | |
| 3,535,215 A | 10/1970 | Grotheer | |
| 3,616,416 A | 10/1971 | Linenberg et al. | |
| 4,132,616 A | 1/1979 | Tantram et al. | |
| 4,268,370 A | 5/1981 | Neti | |
| 4,290,431 A | 9/1981 | Herbert et al. | |
| 4,652,359 A | 3/1987 | Niedrach et al. | |
| 4,810,352 A | 3/1989 | Bone et al. | |
| 5,106,482 A | 4/1992 | Milstein et al. | |
| 5,200,044 A | 4/1993 | Milstein et al. | |
| 5,522,980 A | 6/1996 | Hobbs et al. | |

(Continued)

FOREIGN PATENT DOCUMENTS

| | | |
|---|---|---|
| CN | 104094106 A | 10/2014 |
| CN | 203929706 U | 11/2014 |

(Continued)

OTHER PUBLICATIONS

Advisory Action (PTOL-303) Mailed on Dec. 31, 2019 for U.S. Appl. No. 14/174,459.

(Continued)

*Primary Examiner* — Gurpreet Kaur
(74) *Attorney, Agent, or Firm* — Alston & Bird LLP

(57) ABSTRACT

A lead-free galvanic oxygen sensor having an aqueous electrolyte and a bismuth anode is disclosed. The electrolyte contains a polyol in addition to water and a salt. Surprisingly, a sensor with such an electrolyte has an increased resistance to passivation. The suppressed passivation of the bismuth anode leads to a sensor lifespan, in some instances, of greater than 100 days. The polyol can be added in the amount of between 20% and 30%. The polyol can comprise D-sorbitol, meso-erythritol, or glycerol. In some instances, the polyol in the electrolyte can increase the time until a sudden rise in potential for the sensor, while maintaining a constant current on the bismuth anode, of greater than 14 minutes.

12 Claims, 1 Drawing Sheet

(56) References Cited

U.S. PATENT DOCUMENTS

| | | | |
|---|---|---|---|
| 7,727,368 | B2 | 6/2010 | Gambert |
| 2002/0005352 | A1 | 1/2002 | Offenbacher |
| 2010/0252432 | A1 | 10/2010 | Kitazawa |
| 2013/0040224 | A1 | 2/2013 | Kishimoto et al. |
| 2014/0090977 | A1 | 4/2014 | Boardman |

FOREIGN PATENT DOCUMENTS

| | | |
|---|---|---|
| DE | 2924748 A1 | 1/1980 |
| DE | 2924787 A1 | 1/1981 |
| EP | 0097554 A2 | 1/1984 |
| EP | 1593962 B1 | 8/2013 |
| JP | 52-127392 A | 10/1977 |
| JP | 52-131790 A | 11/1977 |
| JP | 57-119254 A | 7/1982 |
| JP | 61-238231 A | 10/1986 |
| JP | 06-066761 | 3/1994 |
| JP | 2015-505358 A | 2/2015 |
| WO | 2013/039414 A1 | 3/2013 |
| WO | 2013/049752 A1 | 4/2013 |

OTHER PUBLICATIONS

Applicant Initiated Interview Summary (PTOL-413) Mailed on Jul. 2, 2019 for U.S. Appl. No. 14/174,459.

Applicant Initiated Interview Summary (PTOL-413) Mailed on Mar. 27, 2020 for U.S. Appl. No. 14/174,459.

Cobianu et al., "Lead-Free Galvanic Oxygen Sensors—A Conceptual Approach", (Copyrights) 2012 IEEE.

DE29247480—English Translation of Claims.

DE29247480—English Translation of Description.

Decision to Grant for related European Application No. 15152907.0 dated Nov. 7, 2019, 2 pages.

English translation of First Office Action from corresponding CN application 201510177944.0, dated Mar. 30, 2018.

English-language translation of Office Action and prior art search results for corresponding JP patent application 2015-040237 dated Aug. 31, 2018.

English-language translation of patent publication CN 104094106, dated Oct. 8, 2014.

English-language translation of patent publication CN 203929706, dated Nov. 5, 2014.

English-language translation of patent publication DE 29 24 787, dated Jan. 22, 1981.

English-language translation of patent publication JP 2015-505358, dated Feb. 19, 2015.

English-language translation of patent publication JP 52-127392, dated Oct. 25, 1977.

English-language translation of patent publication JP 52-131790, dated Nov. 4, 1977.

English-language translation of patent publication JP 57119254, dated Jul. 24, 1982.

English-language translation of patent publication JP 61-238231, dated Oct. 23, 1986.

English-language translation of patent publication JP H6-66761, dated Mar. 11, 1994.

Extended European Search Report for related European Application No. 15152907.0 dated Jun. 26, 2015, 8 pages.

Final Rejection Mailed on Dec. 18, 2017 for U.S. Appl. No. 14/174,459.

Final Rejection Mailed on Mar. 6, 2017 for U.S. Appl. No. 14/174,459.

Final Rejection Mailed on Oct. 25, 2019 for U.S. Appl. No. 14/174,459.

Intention to Grant for related European Application No. 15152907.0 dated Jul. 10, 2019, 8 pages.

Non-Final Rejection Mailed on Feb. 20, 2020 for U.S. Appl. No. 14/174,459.

Non-Final Rejection Mailed on Jun. 28, 2017 for U.S. Appl. No. 14/174,459.

Non-Final Rejection Mailed on Jun. 28, 2018 for U.S. Appl. No. 14/174,459.

Non-Final Rejection Mailed on Mar. 26, 2019 for U.S. Appl. No. 14/174,459.

Non-Final Rejection Mailed on Sep. 8, 2016 for U.S. Appl. No. 14/174,459.

Notice of Allowance and Fees Due (PTOL-85) Mailed on Jan. 29, 2019 for U.S. Appl. No. 14/174,459.

Office Action and prior art search results for corresponding JP patent application 2015-040237 dated Aug. 31, 2018.

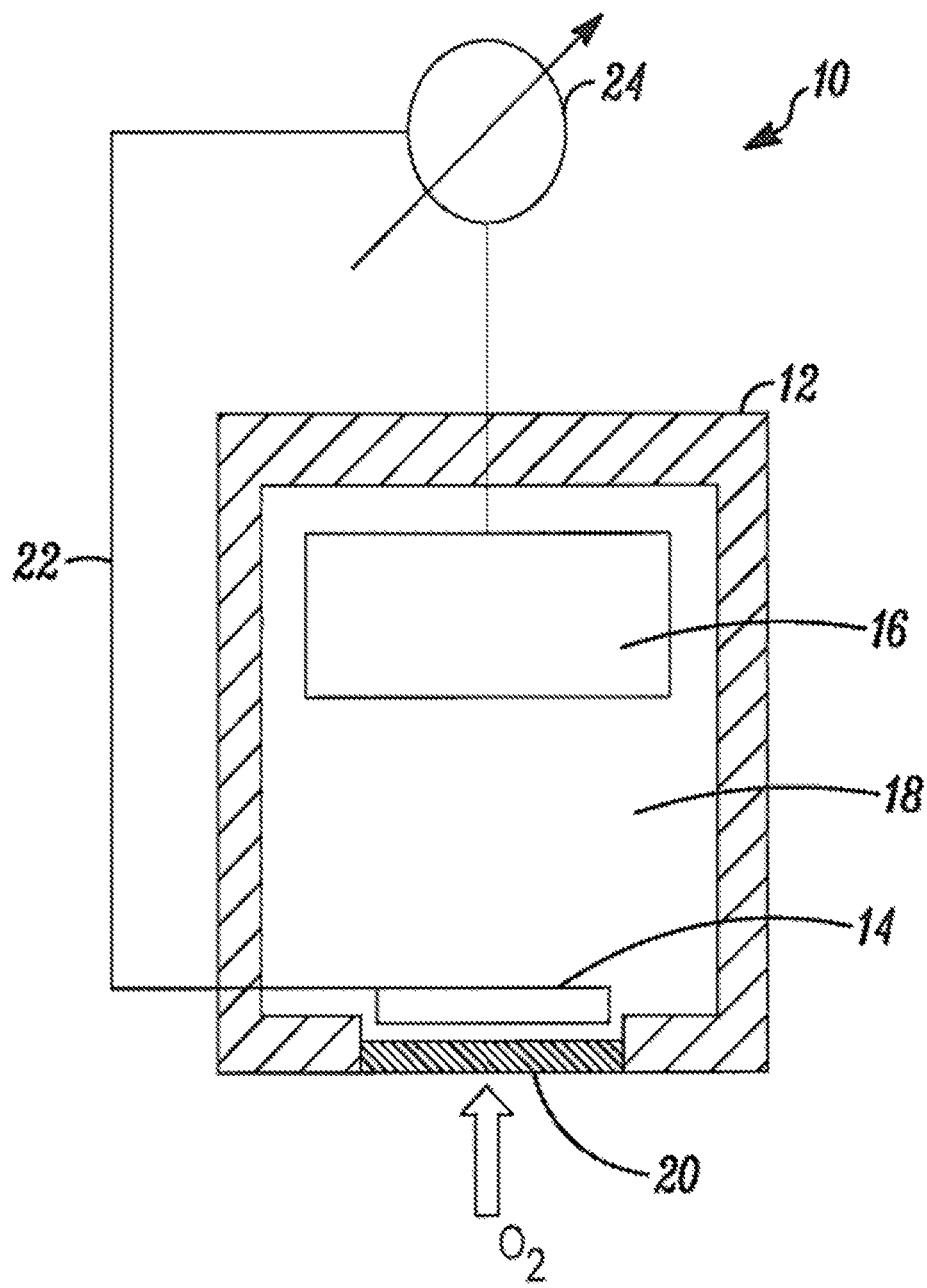

LEAD-FREE GALVANIC OXYGEN SENSOR

CROSS-REFERENCE TO RELATED APPLICATIONS

This application is a continuation of, and claims priority to, and the benefit of, U.S. Non-Provisional patent application Ser. No. 14/174,459, filed Feb. 6, 2014, entitled "Lead-Free Galvanic Oxygen Sensor," the entire disclosures of which are hereby incorporated herein by reference in their entireties for all purposes.

FIELD

This application pertains to a lead-free galvanic oxygen sensor. More particularly, the application pertains to a lead-free galvanic oxygen sensor having a housing, a cathode, a bismuth-based anode, and an aqueous electrolyte including a salt and a polyol.

BACKGROUND

Galvanic oxygen sensors based on consumable lead anodes are well-known. These instruments are generally reliable and have good sensitivity. The presence of lead, however, is undesirable in such an instrument due to environmental and health concerns associated with lead contamination.

Thus, there is a need for a reliable, sensitive galvanic oxygen sensor, which avoids the use of lead anodes.

Recently, there have been attempts to replace lead anodes with those made of zinc, aluminum, and tin. It appears that those types of anodes have a very limited lifetime though, due to the self-corrosion and passivation of the anode surface.

There is thus a continuing need for a lead-free galvanic oxygen sensor. It was surprising and unexpected that the addition of a polyol to an aqueous electrolyte prevents passivation of a bismuth anode in a galvanic oxygen sensor.

BRIEF DESCRIPTION OF THE DRAWINGS

FIG. 1 is a schematic illustration of a lead-free galvanic oxygen sensor.

DETAILED DESCRIPTION

While disclosed embodiments can take many different forms, specific embodiments hereof are shown in the drawings and will be described herein in detail with the understanding that the present disclosure is to be considered as an exemplification of the principles hereof, as well as the best mode of practicing same, and is not intended to limit the claims hereof to the specific embodiment illustrated.

The present invention relates to a lead-free galvanic oxygen sensor. FIG. 1 depicts a lead-free galvanic oxygen sensor 10 shown generally in accordance with one illustrated embodiment. The sensor 10 can be constructed with a plastic or metal housing 12. Included within the housing 12 are a cathode 14, a bismuth anode 16, an aqueous electrolyte including a salt and a polyol 18, and a barrier 20 (permeable membrane or capillary). The cathode 14 and anode 16 can be coupled to an external load resistor 24 by a set of wire collectors 22.

The cathode 14 is an electrically conductive material selected from the group consisting of platinum, gold, silver, palladium, rhodium, iridium and carbon plated with platinum, gold, silver, palladium, rhodium, or iridium or any other suitable material. In one embodiment, the cathode 14 is made of a polytetrafluoroethylene (PTFE) membrane impregnated with a high surface area platinum catalyst embedded in a carbon matrix.

The anode 16 is made of bismuth, which is thermodynamically stable in water. The standard potential for the following reaction: $Bi_2O_3 + 3H_2O_{(l)} + 6e^- \cdot 2Bi_{(s)} + 6OH^-$ is −0.46 volt. There is no self-corrosion due to hydrogen evolution at the anode and no self-corrosion due to hydrogen evolution at the cathode. Importantly, bismuth is commercially available and is not toxic.

The aqueous electrolyte in the sensor contains a salt and a polyol. The salt is selected from the group consisting of potassium hydroxide, sodium hydroxide, potassium acetate, and sodium acetate. In yet another embodiment, the salt is potassium hydroxide. The concentration of potassium hydroxide ranges from about 1 M to saturation.

The salt can also be ammonium quaternary hydroxide, such as $R_4N^+OH^-$ wherein R is an alkyl group selected from the group consisting of methyl, ethyl, propyl, butyl, and mixtures thereof. The electrolyte is not consumed by the oxygen sensing reaction. Furthermore, water is not involved in the overall electrochemical reaction so that the water level of the sensor will be governed by external factors.

In other sensors, the electrochemical oxidation of bismuth leads to the formation of a $Bi_2O_3$ layer on the surface of the electrode in the presence of water in a neutral or an alkaline electrolytic environment. That layer passivates the electrode, which means no current can flow through the surface at moderate voltages.

Surprisingly, the addition of a polyol to the aqueous electrolyte suppresses passivation of the bismuth anode. The polyol can be glycerol, erythritol, sorbitol, ethylene glycol, and mixtures thereof. In one embodiment, the polyol is glycerol. The glycerol can be present in the range of about 5% to about 70% by volume. In yet another embodiment, the glycerol is present at about 20% to about 30% by volume.

The permeable barrier 20 is selectively permeable to oxygen. For example, a tetrafluoroethylene resin membrane or a tetrafluoroethylene-hexafluoropropylene copolymer membrane can be used. It is also possible to use a capillary as diffusion barrier.

As for the wire collectors 22, these can be made of nickel or platinum.

It was an unexpected and surprising benefit that the addition of a polyol to the aqueous electrolyte would lead to prevention of passivation of the bismuth anode that leads to decreased sensor life. Such a sensor has an excellent linearity for the oxygen partial pressure. The signal at oxygen is 4.7 times higher than that in air.

In addition, an accelerated lifetime test of a lead-free oxygen sensor having a bismuth anode was carried out in pure oxygen with an electrolyte containing either 7 M KOH in water or 7 M KOH with a mixture of 30% by volume glycerol in water as solvent. The sensor having the KOH alone stopped working after 7 days due to passivation of the bismuth anode. The expected lifetime in air is one month. Surprisingly, the sensor having the KOH and glycerol mixture worked for 167 days in oxygen. The expected lifetime in air was two years.

In another test, galvanostatic measurements were done on the different polyols to determine their suitability in the oxygen sensor. Electrolyte solutions were prepared having 3 g of the desired polyol dissolved/mixed in 7 ml of 10 M KOH, with the exception of ethanol in which the solvents did not mix completely. The current on the bismuth electrode was kept constant at 30 mA and the time of a sudden rise in potential was noted.

TABLE 1

|  | $H_2O$ | Ethanol | D-sorbitol | Ethylene glycol | Meso-erythritol | Glycerol |
|---|---|---|---|---|---|---|
| Time to sudden rise in potential (min.) | 0.75 | 0 | 2.5 | 8.5 | 14.5 | 36.3 |
| No. of measurements | 2 | 1 | 2 | 2 | 2 | 3 |

Thus, these experiments demonstrate the suitability of the claimed polyols in the oxygen sensor described herein. Such a bismuth electrode and aqueous electrolyte comprising a polyol and a salt can be useful in other electrochemical sensors and galvanic cells for other purposes, as in batteries.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is/are:

1. A galvanic oxygen sensor comprising:
   a housing at least partially containing a cathode, a bismuth anode, and an aqueous electrolyte at least partially surrounding the cathode and the bismuth anode within the housing, the bismuth anode being substantially free of lead and silver, the aqueous electrolyte comprising an alkaline salt and a polyol selected from among: glycerol, erythritol, and sorbitol,
   wherein, when oxygen is introduced to the cathode, an electro-chemical reaction between the cathode and the oxygen is initiated to form hydroxide,
   wherein the electro-chemical reaction consumes a portion of bismuth from the bismuth anode in the presence of the aqueous electrolyte in an alkaline electrolytic environment to form a bismuth oxide layer at a surface of the bismuth anode without consuming the aqueous electrolyte, and
   wherein the polyol reduces passivation of the bismuth anode by limiting formation of the layer of the bismuth oxide on a surface of the bismuth anode, thereby increasing a lifespan of the galvanic oxygen sensor,
   wherein the cathode comprises carbon plated with platinum, and
   wherein the cathode comprises a polytetrafluoroethylene (PTFE) membrane impregnated with a high surface area platinum catalyst embedded in a carbon matrix.

2. The galvanic oxygen sensor of claim 1, wherein the alkaline salt is selected from a group consisting of potassium hydroxide, sodium hydroxide, potassium acetate, and sodium acetate.

3. The galvanic oxygen sensor of claim 1, wherein the alkaline salt is an ammonium quaternary hydroxide, $R_4N^+OH^-$, wherein R is an alkyl group selected from a group consisting of methyl, ethyl, propyl, and butyl.

4. The galvanic oxygen sensor of claim 1, wherein the aqueous electrolyte comprises about 20% to about 70% by volume of the polyol.

5. The galvanic oxygen sensor of claim 1, wherein, by suppression of passivation of the bismuth anode, the polyol increases the lifespan of the galvanic oxygen sensor to greater than 100 days.

6. The galvanic oxygen sensor of claim 1, wherein the polyol comprises glycerol.

7. The galvanic oxygen sensor of claim 6, wherein the aqueous electrolyte comprises about 5% to about 70% glycerol by volume.

8. The galvanic oxygen sensor of claim 7, wherein the aqueous electrolyte comprises about 20% to about 30% glycerol by volume.

9. The galvanic oxygen sensor of claim 8, wherein the aqueous electrolyte comprises greater than about 1 M potassium hydroxide.

10. The galvanic oxygen sensor of claim 9, wherein the electro-chemical reaction is a water-free electro-chemical reaction.

11. A galvanic oxygen sensor comprising:
    a cathode and a bismuth anode disposed within a housing, wherein the bismuth anode is substantially free of lead and silver; and
    an aqueous electrolyte disposed within the housing and in contact with the cathode and the bismuth anode, the aqueous electrolyte comprising an alkaline salt and a polyol, the polyol comprising one or more of: glycerol, erythritol, and sorbitol,
    wherein, when oxygen is introduced to the cathode within the housing, an electro-chemical reaction between the cathode and the oxygen is initiated to form hydroxide while a portion of bismuth is consumed at the bismuth anode to form bismuth oxide,
    wherein the polyol reduces passivation of the bismuth anode, thereby increasing a lifespan of the galvanic oxygen sensor to greater than 100 days,
    wherein the polyol is glycerol and the alkaline salt is potassium hydroxide,
    wherein the aqueous electrolyte comprises between 20% and 30% by volume of the polyol dissolved in the aqueous electrolyte, and wherein the aqueous electrolyte comprises 1 M or greater of the potassium hydroxide, and
    wherein the cathode comprises a polytetrafluoroethylene (PTFE) membrane impregnated with a high surface area platinum catalyst embedded in a carbon matrix.

12. The galvanic oxygen sensor of claim 11, wherein the alkaline salt is an ammonium quaternary hydroxide, $R_4N^+OH^-$, and wherein R is an alkyl group selected from a group consisting of: methyl, ethyl, propyl, and butyl.

* * * * *